(12) United States Patent
Osborn

(10) Patent No.: US 7,389,436 B2
(45) Date of Patent: *Jun. 17, 2008

(54) POWER MANAGEMENT SYSTEM

(75) Inventor: Paul Anthony Osborn, Colne (GB)

(73) Assignee: AT&T Laboratories Cambridge Limited, Cambridge (GB)

( * ) Notice: Subject to any disclaimer, the term of this patent is extended or adjusted under 35 U.S.C. 154(b) by 157 days.

This patent is subject to a terminal disclaimer.

(21) Appl. No.: 10/916,499

(22) Filed: Aug. 12, 2004

(65) Prior Publication Data

US 2005/0010748 A1    Jan. 13, 2005

Related U.S. Application Data

(62) Division of application No. 09/812,897, filed on Mar. 21, 2001, now Pat. No. 6,931,555.

(30) Foreign Application Priority Data

Mar. 22, 2000  (GB)  .................. 0006980.7

(51) Int. Cl.
*G06F 1/32*  (2006.01)
(52) U.S. Cl. .............. 713/323; 713/300; 713/310; 713/320; 713/321; 713/322; 713/324; 713/330; 713/340
(58) Field of Classification Search .......... 713/300, 713/310, 320–324, 330, 340
See application file for complete search history.

(56) References Cited

U.S. PATENT DOCUMENTS

| 5,167,024 | A | 11/1992 | Smith et al. |
| 5,361,397 | A | 11/1994 | Wright |
| 5,715,467 | A | 2/1998 | Jirgal |
| 5,752,050 | A | 5/1998 | Hernandez et al. |
| 5,757,773 | A | 5/1998 | Tsuji |
| 5,832,280 | A * | 11/1998 | Swanberg .................. 713/300 |
| 5,949,974 | A | 9/1999 | Ewing et al. |
| 6,092,208 | A | 7/2000 | Reneris |
| 6,243,821 | B1 | 6/2001 | Reneris |
| 6,272,642 | B2 | 8/2001 | Pole, II et al. |
| 6,289,228 | B1 | 9/2001 | Rotstein et al. |
| 6,346,873 | B1 | 2/2002 | Suzuki et al. |
| 6,487,668 | B2 | 11/2002 | Thomas et al. |

(Continued)

FOREIGN PATENT DOCUMENTS

JP     10-207583     8/1998

OTHER PUBLICATIONS

United Kingdom Search Report for Application # GB0006980.7

*Primary Examiner*—Abdelmoniem Elamin
(74) *Attorney, Agent, or Firm*—Banner & Witcoff, Ltd.

(57) ABSTRACT

A power management system for electrical and electronic apparatus has a number of components which may be switched to a low power state. A power controller (20) is coupled to each component in the apparatus and a plurality of power modules (22, 24, 26) are each associated with a component. Each power module is coupled to the power controller for each component its associated component makes use of. It sends signals to that power controller indicating whether or not its associated component wishes to make use of the component coupled to that power controller. The power controller switches its component to a low or high power state in dependence on the received signals.

10 Claims, 2 Drawing Sheets

U.S. PATENT DOCUMENTS 6,665,802 B1    12/2003  Ober
6,697,649 B1     2/2004  Bennett et al.

6,931,555 B2 *   8/2005  Osborn .................... 713/320

* cited by examiner

POWER MANAGEMENT SYSTEM

The present application is a divisional application of and claims priority to Ser. No. 09/812,897 now U.S. Pat. No. 931,555, filed Mar. 21, 2001, and issued Aug. 16, 2005, which claims priority to United Kingdom patent application No. 0006980.7 filed in the United Kingdom on Mar. 22, 2000.

This invention relates to a power management system of the type that may be used with a low power embedded radio network such as that described in our United Kingdom Patent Application No. 9720856.5.

United Kingdom Patent Application No. 9720856.5 describes a system in which devices which would benefit from being connected in a network or would normally be connected in a network are each provided with a small radio transmitter and controller which enables them to determine other objects in their vicinity which perform functions which would be of benefit to them. For example, a hand-held data organizer could download a set of telephone numbers to the internal storage of a telephone if both fitted with devices of this type.

Some of the objects of this type may be mains powered but, in many applications, this will not be the case and the communicating nodes will be battery powered. In this case, low power operation is essential and users will expect nodes to operate for many months or even years without battery replacement. This low power consumption objective is difficult to achieve and is exacerbated by the fact that, in many cases, the primary function of the object will involve communication rather than internal processing.

Furthermore, the nodes will usually be based upon digital microprocessor technologies which may include software consisting of processes running under a real time operating system. This again makes low power operation very difficult to achieve.

In such a system, many hardware and software components will have specific dependencies on other components which will be inter-related. Low power operation can be achieved by ensuring that power dissipating components are powered off whenever possible.

For example, a system might contain a radio controller whose responsibilities include initiating and controlling data packet transmission and reception under the control of a microprocessor. It would be necessary for the microprocessor to be fully powered for the radio controller to perform these functions. A radio controller might signal the microprocessor that a radio event had occurred. There would therefore be a directional dependency between the radio and the microprocessor. That is to say, the microprocessor must be powered on whenever the radio is in use. However, there is not the same dependency in the reverse direction. That is to say, it is possible and fairly common that the microprocessor would be in operation while the radio was powered off.

In a complete system, the number of components and their relationships would be much more complex and a mechanism is therefore required to handle these dependencies in a simple manner to ensure that low power operation of components such as the radio is attained by default rather than exception.

Power conservation in existing microprocessor systems is normally centralized and based on simple procedures such as time-outs and local usage monitoring. For example, in a personal computer disk drives may be switched into a low power state if no keyboard or mouse activity is detected within a predetermined time interval. This interval is normally chosen to reflect human usage patterns. It requires little change to the rest of the system but has a very coarse grained responsiveness. This is not appropriate when the emphasis is on achieving low power operation such as in embedded systems where a very fine granularity of control is desired and the emphasis is on very low power operation. In networks of this type, a much more aggressive low power strategy is therefore required such that the default state of the node can be powered off rather than on.

Preferred embodiments of the present invention provide an architecture and procedures for achieving low power operation based on a flexible distributed democratic voting mechanism wherein power modules associated with specific hardware and software components express their dependencies on other node components through a simple voting procedure. As a result, only those components currently in use or needed by another component would normally be in the on state and therefore dissipating power. The system is highly modular and flexible and can accommodate a wide range of node component dependencies in an organized and integrated fashion.

The invention is defined in its various aspects with more precision in the appended claims to which reference is made.

Preferred embodiments of the invention will now be described in detail by way of example with reference to the accompanying drawings in which:

FIG. 1a) and b) show two different types of communication system in which embodiments of the present invention may be used;

Figure 1A:
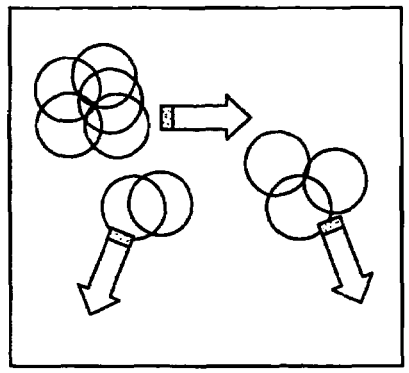

To understand the usefulness of an embedded network we shall consider two different ways in which mobile devices can use services available from an embedded network. FIG. 1(a) and (b) shows these schematically.

FIG. 1(a) shows a set of nodes or communication points which are able to move around but remain in range of each other. This is referred to as a cloud of devices of the type which might be carried about by a person in luggage, in a vehicle or between a small group of people working in the same environment. Such devices can be made aware of each other via their nodes which can communicate by radio with other nodes and offer services to each other. They may be able to use each other's services sometimes for extended periods. For example, a personal data organizer may be authorized to use the mobile telephone of its user for e.g. sending and receiving messages by fax or E-mail.

Figure 1B:
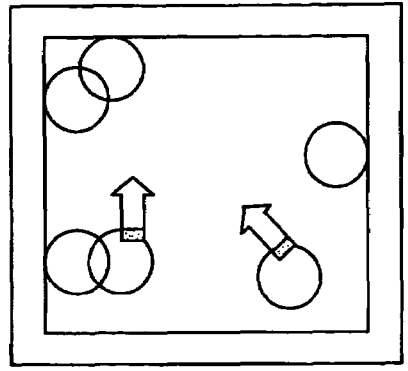

FIG. 1(b) shows endpoints which include nodes and which move around occasionally coming within range of other nodes that provide services to which they have no special authorization. This is referred to as a nomadic node. The sort of services it might use are those that tell it about its environment e.g. position and local facilities, and those which might allow it to personalize another node by configuring it in a way that is suitable for a particular user. For example, a telephone may be pre-primed with a set of commonly dialed numbers when it detects a node owned by the person who has those commonly dialed numbers nearby.

Radio technology is used for communications between nodes. This is because it possesses the characteristics needed for ad hoc, peer-to-peer communications in virtually all configurations and environments. The type of interaction which is required between nodes must be unrestricted, that is to say nodes must be able to communicate when in range even if they are being carried in a briefcase, coat pocket etc. Thus, infrared communication would not be appropriate in the general case because it requires a line of sight to be able to communicate.

Systems embodying the present invention may be decentralized. If they are, then every device must be able to independently describe itself to a sufficient level for it to be useful to others. This decentralized approach is used because knowledge about nearby objects which have nodes associated with them is more important than the knowledge of other devices which are not nearby. In particular, using such a system eliminates the need to contact and maintain a centralized database wherever a new node is encountered. That would require global connectivity.

Figure 2:
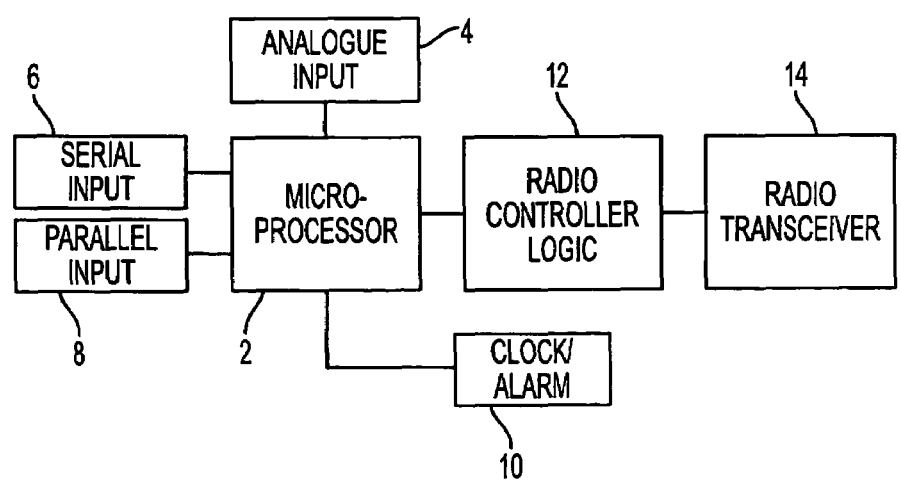
FIG. 2 shows a block diagram of a communication point or node for use in an embodiment of the invention.

FIG. 2 shows a block diagram of a node suitable for use in the mobile radio network. The core of this is a micro processor 2. This has three possible inputs, an analog input 4, a serial digital input 6, and a parallel digital input 8. In some special situations it may be necessary to provide other inputs.

Also, coupled to the microprocessor is a clock/alarm device 10. This wakes up the processor from low power sleep at programmed intervals.

Radio controller logic 12 is connected to the micro processor 2 for controlling the provisions of signals to and from the microprocessor and this is used to control a radio transceiver 14 via which signals are sent to and received from other nodes which are in range. A 418 MHZ FM transceiver is suitable for this purpose but other frequencies could be used.

An embodiment of the present invention provides a distributed democratic power architecture (DDPA) which controls powering on and off of nodes by monitoring system requirements. It achieves this by making the default state of any hardware component off. Thus, if a component is used by two applications, A and B, then it is A and B which should control the power state. It is nevertheless important that neither application interferes with the other. As a result, a form of negotiation is used. The component is powered off if, and only if, neither A or B need it. Conversely, it is powered on if either A or B need it. This is achieved by the use of power controllers and power modules with the application.

DDPA is based around the concept of two types of entities, power controllers and power modules. A power controller is responsible for a particular hardware component, e.g., the CPU or the radio, and it can switch that component between a low power state and a high power state. It may be implemented, at least in part, by a software module which contains codes for powering the component off and on. Alternatively it may be purely hardware implemented.

The problem is that the controller does not know when it should power the component on or off. Therefore, to influence the behavior of a particular power controller, power modules are used. Each code module which wishes to influence the power controller requires a power module connected to that controller. These provide a means for voting either for or against the connected power controller entering a low power state. The power controller will enter the low power state when all associated power modules are in favor and will leave that state the moment one related power module votes against it. The mechanism whereby the signals are exchanged by power modules of the controllers is implementation and component specific. For example, in a real time message based system, these votes can be indicated by sending the appropriate message from the given power module to the power controller.

In some applications, power controllers will contain power modules which are also connected to other power controllers. This enables hierarchies to be created so that a power controller may vote for other power controllers but not for itself (i.e. circular dependencies must be avoided). As a general rule, modules should vote for all power controllers they are dependent upon and not rely upon hierarchies.

Figure 3:
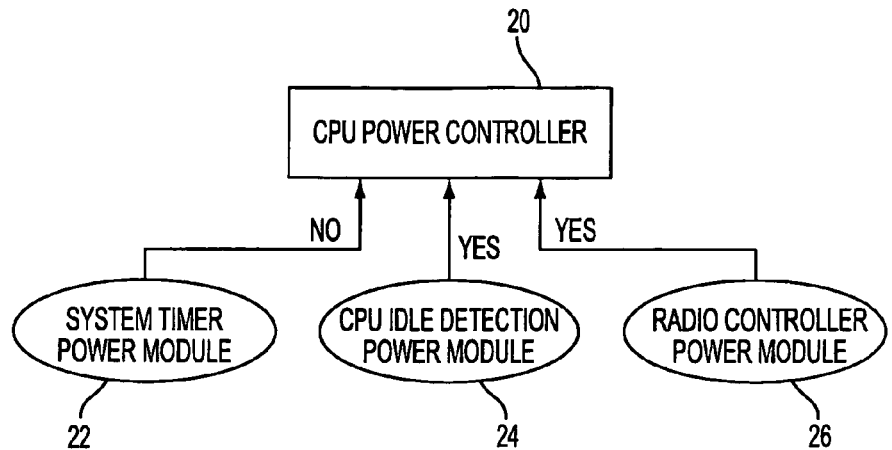
FIG. 3 shows a schematic diagram of the software used by the circuit of FIG. 2.

FIG. 3 shows visually the relationships between power modules and controllers. In this example, a CPU power controller 20 has three associated power modules for the system timer power module 22, the CPU idle detection power module 24, and the radio controller power module 26. The dependency discussed above is indicated on these by an arrow drawn from a power module to a power controller. In this example, all three power modules would have a vote on the powering of the CPU.

Each power module can put a Yes/No vote to the power controller and the power controller has a portion which detects these votes to determine whether or not the hardware component is currently required to be powered up or powered down. When all input votes indicate that it should be powered down, the power controller initiates powering down of the hardware component. Otherwise it remains in its powered up state. When all the input votes have just indicated that powering down should be implemented, the power controller indicates to its attached power modules that it is about to initiate the powering down on the hardware component. Once each module has been given the chance to change its vote, the power controller re-examines the input votes. If they are all still Yes, then the hardware component is immediately powered down. If they are not all still Yes, then it is left in its powered up state. This procedure may be arranged to accommodate the fact that, in some systems, the voting is performed by message passing which is evoked at discrete points in time. The procedures described allow for power modules to perform any preparation they require and to update their vote just prior to the final decision being made by the power controller.

Figure 4:
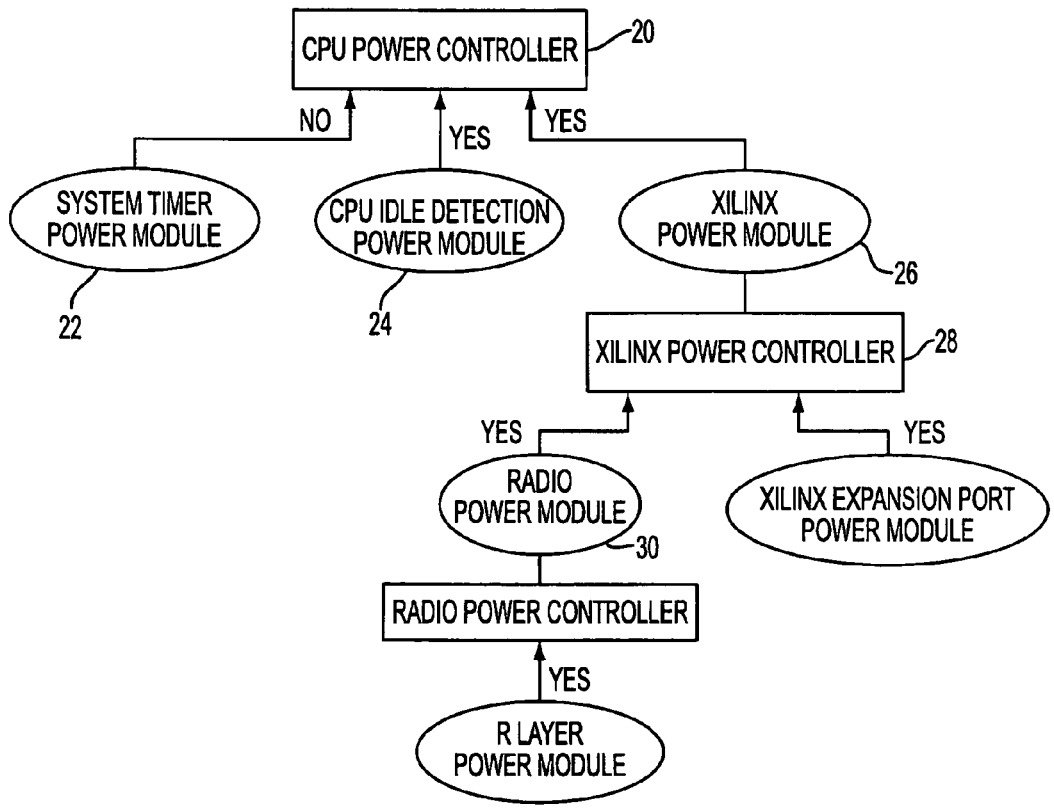
FIG. 4 shows schematically the architecture for power controllable circuitry required for a module embodying the invention.

As discussed above, power controllers can accept inputs from one or more power modules associated with components which are dependent upon that power controller's component. One example is shown in FIG. 4.

In this, the CPU power controller 20 has three attached power modules for the system timer 22, the CPU idle detector 24, and the XILINX radio controller 26. In order for the CPU power controller to initiate a CPU power down, all three of these modules must register a Yes vote.

Each power module may have two helper functions called Power Down FN and Power Up FN. Once active, as soon as it is established that all power module votes are in favor of powering down, the power controller will take the following steps. Every related power module which has one will have its power down FN called. After calling each power down FN, the voting is double checked. If those are still in favor, then the next power down FN is called, etc. If the low power state has been vetoed with a No vote, then the power up FN's are called for each module which previously had its power down FN called. If after notification, voting is still in favor of powering down then the power controller's power down FN is called. This initiates the powering down of the CPU hardware.

After the entering a low power state, the first No vote detected will cause the power controller to leave the low power state by taking the following actions. Firstly, the power controller's power up FN is called followed by the power up FN for each related power module.

During system initialization, all power controllers will have been initialized. During this, the system will establish how many power modules wish to vote on each particular power controller. If there are no modules wishing to vote on a particular power controller, then it will be put into a low power state by calling its power down FN. Later, during normal device and process initialization, any code which includes the power module can initialize that power controller. It is at this stage that a connection to the relevant power controller is formed and an initial vote registered. Power controllers cannot take any power saving action until all related power modules have been initialized, otherwise the system may not start correctly.

Nodes may be deployed in a variety of roles, so to simplify development, code is written in a modular fashion whereby code in each module may be written independently of and without reference to the other modules. When a node is customized, for a particular role, the required code modules are linked together to form an image which is downloaded to the node. As a result, when writing a module, any decisions or actions that may conflict with other modules should be avoided. Typically, the other modules may be specified as required and their presence assumed. However, this reduces the variety of available module permutations. This has particular implications to power saving.

If a given component is used by more than one code module, none may make unilateral decisions as to the power state of that component in order to ensure correct operation of both modules. The power architecture described provides an arbitration mechanism between code modules which resolves these independent requirements for power by allowing code modules to make their own decisions.

Additionally, because power controllers automatically locate and link to power modules included in the image, if an image is changed by the removal of a code module, the controller will continue to operate correctly with those remaining modules. For example, in FIG. 4, if the XILINX Expansion Port was not needed, the code module for that device driver would not be built into the image. As a result the state of XILINX would depend purely upon the needs of the radio driver.

Finally, the power controllers themselves can be added to or removed from the image without damaging the power architecture. If a power controller is omitted, the corresponding component will always be powered up because there is nothing to power it down, and the associated power modules will remain unlinked and inactive. This facility is useful for building images for main powered nodes on which power saving is unnecessary or even undesirable.

A power controller may be provided integrally with a power module. This will lead to savings in the number of components used if hardware implemented on savings by integrating software in a software implementation. This integrated power module is then used to send signals (i.e., votes) to other power controllers indicating that its associated component wishes to make use of another component associated with another power controller.

In addition to the power controller and power module functions discussed above, each node will normally have a system timer function whose operation is slightly different. The system timer is used by modules to schedule the signaling of future events. For example, in a message based implementation, this is accomplished by a code module sending the appropriate message to the system timer specifying the future event time. When this occurs, the system timer returns an appropriate message to the calling code module. Each node has a single system timer and it maintains an ordered list of all future events that have been scheduled. In particular, it keeps track of time for the next event scheduled to occur (which we will refer to as TNS).

The system timer is different to other modules in that when the node is operating normally, its default state is powered on rather than off. The only time when this is not the case is when the node is completely unpowered, i.e., not in use. The intent is that when the node is operating and drops into its lowest possible power state, the system timer will be the only hardware component which would remain fully powered. When this happens, the system timer is responsible for initiating the repowering of other hardware components as they are required.

In the system of FIG. 4, the system timer bases its votes on current system time, and the next scheduled event time, INS. A system dependent threshold interval INS is set such that when the difference between the current system time and the next scheduled event is greater than INS, the system timer will vote for powering down. Otherwise, it will vote to keep the module powered up. The purpose of this is that if the time until the next system timer event is sufficiently long, the system timer will vote for power shutdown. The system timer's power module makes use of a power down helper FN to make a last minute check on the time to the next scheduled event, allowing a veto if it is now too soon to permit power down.

Certain components such as the radio will be attached to the CPU as a peripheral device. In this case, the component's power controller would normally be implemented as a code module run on the CPU. This is obviously not the case for the CPU. CPU repowering would normally be accomplished by having the system timer assert the appropriate hardware signals so that it can be repowered and code executions sent to the appropriate CPU power controller module.

Idle detection of CPU software is very important in the proposed architecture. This is because the system must be able to detect that software running on the CPU is in an idle state. When this occurs, it means the CPU is not currently performing any tasks which would adversely affect the system if the process were to be powered down. For example, in many embedded network node implementations, the system software would be implemented as a multi-tasking message passing system. In this type of implementation, idle detection can be very easily performed since processes which are idle would normally be blocked as they waited for messages to be delivered via either a message mail box or message queue. Processes that are in this state are only activated when messages arrive via the message passing system. Thus, the processing scheduler has complete information on which processes are currently active and therefore being regularly scheduled. Only when all processes are idle will the idle detection power module vote Yes to remove power from the processor.

Finally, in the example given in FIG. 4, the XILINX power controller also contains a power module which votes as in input to the CPU power controller. Whenever the chip is actually processing an incoming or outgoing packet, it will vote against powering down the CPU. The intent here is that while radio functions are in progress, the CPU is needed so that powering down is not possible.

The XILINX power module is used by the XILINX power controller to keep the CPU awake while the XILINX is in use. The XILINX Expansion Point power module keeps the XILINX chip active whilst the Expansion Point is in use. The Radio power controller uses the Radio power module to indicate if the XILINX is itself influenced by the requirements of the rendezvous module.

The rendezvous layer is a communication protocol which is included as a sublayer of the data link layer. It coordinates and controls the use and powering of the radio so that low power operation may be achieved. The intention is that if the CPU is required but the radio network is not, the XILINX chip will be powered down.

It will be appreciated by those skilled in the art that the embodiments of the invention described above may be implemented in hardware or software or a combination of the two. Also usefulness of this invention is not limited to embedded radio networks and it may be used in individual components such as laptop computers without any radio connectivity, desktop computers, personal digital assistants (PDAs), digital cameras (still or video), digital music players (MP3, minidisk, etc.), mobile phone, global positioning system (GPS) units, and others.

The invention could also be applied in network solutions where a piece of apparatus in the network has a power controller and the power modules are associated with other components in the network and are located remotely from the power controller. Signals from the power modules would be sent to the power controller which would switch its pieces of apparatus between low and high power states to in dependence on the status of the received signals, i.e., the indication as to whether or not any other components wish to communicate with the apparatus.

The invention claimed is:

1. An apparatus which communicates with other apparatuses over radio frequencies, the apparatus comprising:
   a first component configured to be switched between low or high power states, the first component operatively coupled to a first power controller; and
   the first power controller, including a first plurality of power modules, configured to switch the first component between low or high power, states, each power module of the first plurality associated with an associated component configured to use the first component;
   wherein each power module of the first plurality sends at least one signal to the first power controller indicating whether or not the associated component associated with the power module is currently required to be in a high power state,
   wherein the first power controller is configured to switch the associated component associated with the power module between low or high power states in dependence on the at least one signals received from the power modules,
   wherein the first power controller switches the first component to the low power state after a predetermined delay and a re-examination of a status of the at least one signal received from the power modules.

2. An apparatus which communicates with other apparatuses over radio frequencies, the apparatus comprising:
   a first component configured to be switched between low or high power states, the first component operatively coupled to a first power controller; and
   the first power controller, including a first plurality of power modules, configured to switch the first component between low or high power states, each power module of the first plurality associated with an associated component configured to use the first component;
   wherein each power module of the first plurality sends at least one signal to the first power controller indicating whether or not the associated component associated with the power module is currently required to be in a high power state,
   wherein the first power controller is configured to switch the associated component associated with the power module between low or high power states in dependence on the at least one signals received from the power modules,
   wherein upon switching the first component to the low power state, the first power controller is further configured to monitor input signals from the power modules, and, upon detection of an input signal indicating that the associated component associated with the power module that sent the input signal is currently required to be in a high power state, the first power controller is further configured to switch the first component to the high power state.

3. An apparatus which communicates with other apparatuses over radio frequencies, the apparatus comprising:
   a first component configured to be switched between low or high power states, the first component operatively coupled to a first power controller;
   the first power controller, including a first plurality of power modules, configured to switch the first component between low or high power states, each power module of the first plurality associated with an associated component configured to use the first component; and
   a system timer to schedule predetermined switches between low and high power states,
   wherein each power module of the first plurality sends at least one signal to the first power controller indicating whether or not the associated component associated with the power module is currently required to be in a high power state,
   wherein the first power controller is configured to switch the associated component associated with the power module between low or high power states in dependence on the at least one signals received from the power modules.

4. The apparatus of claim 3, wherein the system timer only causes the first component to switch to the low power state in the absence of any contradictory signals from power modules.

5. An apparatus which communicates with other apparatuses over radio frequencies, the apparatus comprising:
   a first component configured to be switched between low or high power states, the first component operatively coupled to a first power controller; and
   the first power controller, including a first plurality of power modules, configured to switch the first component between low or high power states, each power module of the first plurality associated with an associated component configured to use the first component;
   wherein each power module of the first plurality sends at least one signal to the first power controller indicating whether or not the associated component associated with the power module is currently required to be in a high power state,
   wherein the first power controller is configured to switch the associated component associated with the power module between low or high power states in dependence on the at least one signals received from the power modules,
   wherein the first power controller is further configured to indicate to the first plurality of power modules that the first power controller is ready to switch the first component to the low power state.

6. The apparatus of claim 5, wherein the first power controller is further configured to detect receipt of at least one signal indicating whether or not the associated component associated with at least one power module of the first plurality is currently required to be in the high power state.

7. A method comprising:
monitoring, at a first power controller, a first input signal from a first power module associated with the first power controller, the first input signal indicating whether to power down a first component;
monitoring, at the first power controller, a second input signal from a second power module associated with the first power controller, the second input signal indicating whether to power down the first component;
determining whether the first input signal indicates to power down the first component;
determining whether the second input signal indicates to power down the first component; and
switching the first component to a low power state based upon determining that the first input signal and the second input signal indicate to power down the first component,
wherein switching occurs after a predetermined delay and a re-examination of a status of input signals received from the power modules.

8. A method comprising:
monitoring, at a first power controller, a first input signal from a first power module associated with the first power controller, the first input signal indicating whether to power down a first component;
monitoring, at the first power controller, a second input signal from a second power module associated with the first power controller, the second input signal indicating whether to power down the first component;
determining whether the first input signal indicates to power down the first component;
determining whether the second input signal indicates to power down the first component;
switching the first component to a low power state based upon determining that the first input signal and the second input signal indicate to power down the first component;
monitoring, at the first power controller, a third input signal from the first power module associated with the first power controller, the third input signal indicating whether to power up the first component;
monitoring, at the first power controller, a fourth input signal from the second power module associated with the first power controller, the fourth input signal indicating whether to power up the first component;
determining whether the third input signal indicates to power up the first component;
determining whether the fourth input signal indicates to power up the first component; and
switching the first component to a high power state based upon determining that the third input signal or the fourth input signal indicate to power up the first component.

9. A method comprising:
monitoring, at a first power controller, a first input signal from a first power module associated with the first power controller, the first input signal indicating whether to power down a first component;
monitoring, at the first power controller, a second input signal from a second power module associated with the first power controller, the second input signal indicating whether to power down the first component;
determining whether the first input signal indicates to power down the first component;
determining whether the second input signal indicates to power down the first component;
indicating, from the first power controller to the first and second power modules, that the first power controller is ready to switch the first component to the low power state; and
switching the first component to a low power state based upon determining that the first input signal and the second input signal indicate to power down the first component.

10. The method of claim 9, further comprising detecting receipt of a third input signal from the first power module or the second power module indicating whether not power down the first component.

* * * * *